United States Patent

[11] 3,590,461

[72] Inventor Joseph T. Siler
 P. O. Box 11, Bowling Green, Ky. 42101
[21] Appl. No. 785,323
[22] Filed Dec. 19, 1968
[45] Patented July 6, 1971
 Continuation-in-part of application Ser. No. 722,114, Apr. 17, 1968, now Patent No. 3,509,618.

[54] ALIGNMENT MEANS FOR BUSHINGS HAVING ECCENTRIC BORES
 4 Claims, 3 Drawing Figs.
[52] U.S. Cl. ................................................. 29/240, 81/10
[51] Int. Cl. .................................................. B23p 19/04
[50] Field of Search ............................................ 29/467, 468, 464, 240, 240.5, 237; 81/10

[56] References Cited
UNITED STATES PATENTS
3,257,720 6/1966 Siler ............................ 29/464

Primary Examiner—James M. Meister
Attorney—Julian Caplan, Gregg, Hendricson & Caplan ABSTRACT: Following is disclosed a method and apparatus for improving the alignment of "work" and "blind side" bushings with eccentric bores through utilization of a shaft sized to extend into the bores. A latch element is laterally carried by the shaft and adapted to extend into and retract from indentations in the bores for orienting the bushings. An alignment collar is also carried by the shaft and has an aperture that receives the shaft, with the collar having a larger diameter than the diameter of an engaged bushing to enable application of torque and to give a visual reference for axial angularity misalignment between said bushing and its receiving hole in the structural member. The alignment collar makes more exacting alignment of the bushings possible, particularly when an initial limited interference fit between the bushing and its receiving hole (before final seating) is utilized in the installation procedure.

PATENTED JUL 6 1971 3,590,461

JOSEPH T. SILER
INVENTOR.

BY *Wofford & Felsman*
ATTORNEYS

ALIGNMENT MEANS FOR BUSHINGS HAVING ECCENTRIC BORES

CROSS-REFERENCE TO RELATED APPLICATION

This application is a continuation-in-part of a copending application entitled "Fastener and Assembly Means," Ser. No. 722,114 filed Apr. 17, 1968, now U.S. Pat. No. 3,509,618.

BACKGROUND OF THE INVENTION

In U.S. Pat. Nos. 3,006,443; 3,257,720; and 3,357,730 I disclose new methods and apparatus for connecting structural members having misaligned fastener receiving holes. In those patents, I explain the use of bushings with eccentric, axially extending bores for such purposes. In U.S. Pat. Nos. 3,257,710 and 3,357,730 I explain the use of an elastomer tool for positioning a "blink side" bushing such that its axial bore may be aligned with that of a "work side" bushing. The term "blink side" refers to a structural member or its bushing, which may be partially or completely hidden from view. For example, a full view of such a member or bushing may be obstructed by another structural member, which may be in full view and thus referred to as the "work side" structural member that carries a "work side" bushing. In the above mentioned copending application I disclosed improved methods and apparatus for grasping such bushings and rotating them through use of a shaft having a retractable latch element for aligning the eccentric bores in preparation for receiving a fastener such as a bolt.

A problem sometimes arises by a very slight cocking of one of the bushings in the receiving hole in its structural member. If one of the bushings is thus cocked when the bolt is inserted through the eccentric holes in mating bushings and then tightened, damage to the bushing or the structural member or the bolt may result. It is highly advantageous therefore that some means be provided to enable the determination of any cocking of the bushings to prevent such damage.

BROAD DESCRIPTION

My present invention may be broadly described as one in which an alignment collar is reciprocally mounted on a shaft that carries a latch element engageable with a work side bushing. Such collar has a large diameter shoulder that faces and engages the bushing. The bushing preferably has a planar, exposed surface perpendicular with its axially extending bore that engages a mating, opposed surface on the alignment collar. By pushing forward on the alignment collar and thus against the work side bushing, and by pulling on the shaft upon which the work side bushing and the alignment collar are mounted, a selected initial amount of interference may be obtained between the exterior of the bushing and the hole in which it is mounted in the structural member. By visually inspecting the clearance around the periphery of the alignment collar, which intentionally has a large diameter, any misalignment of the work side bushing and its structural member may be conveniently determined and corrected by rotation of the shaft and alignment collar. Thus, upon removing the shaft and latch element from the bushing and upon inserting a fastener in the bores of the work side and blind side bushings, a final interference fit may be obtained without danger of damage to the bushings or structural member.

DETAILED DESCRIPTION OF A PREFERRED EMBODIMENT

Figure 1:
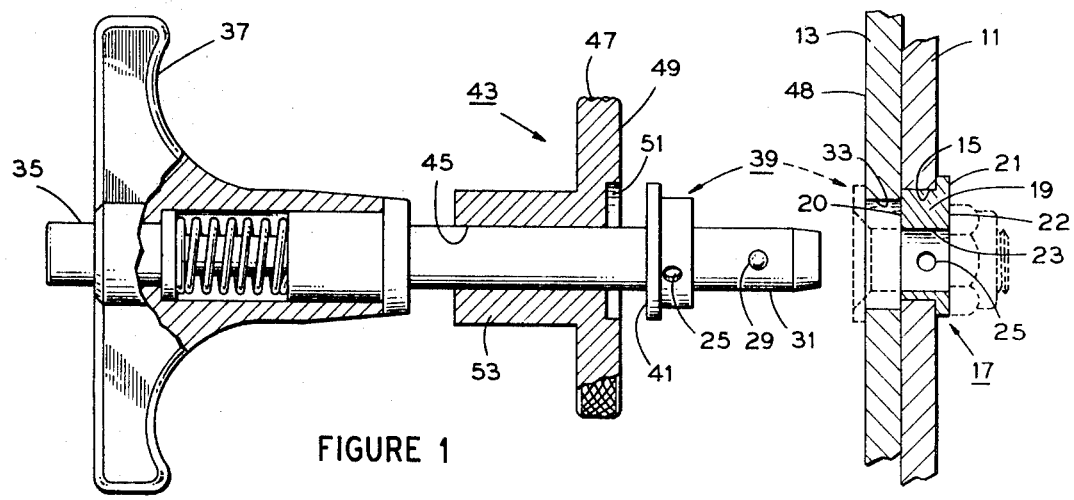
FIG. 1 is a side elevational view, partially in section, of two structural members, one of which has inserted in an aperture therein a blind side bushing. A work side bushing and an alignment collar of the present invention is inserted on a shaft used to align the bushings.

The numeral 11 in the drawing designates a blind side structural member and the numeral 13 designates an identical work side structural member. Inserted in a slightly tapered hole 15 in the blind side structural member 11 is a blind side bushing 17. This bushing has a body portion 19 (slightly tapered in this instance) which is concentrically aligned with an enlarged head portion 21. In addition, the bushing has end surfaces 20 and 22 that are perpendicularly oriented relative to the axially extending bore 23. The bore 23 is formed through the enlarged head and body portions of the bushing, being eccentric relative to the central axis of the body and head, as is further explained in my above mentioned patents.

Figure 3:
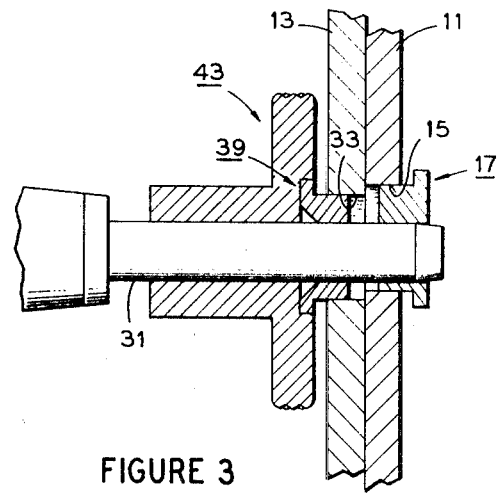
FIG. 3 is a side elevation view, partially in section, showing the work side bushing and alignment collar in position for visually observing any misalignment of the work side bushing.

At least one, but preferably plural indentations 25 are formed diametrically across the axial bore, and in this instance extend completely through respective sides of the cylindrical body portion 19. The position of the indentations and their geometric form are adapted to mate with a latch element or elements 29, a preferred form of which is illustrated in FIG. 1. In this form the latch elements comprise two opposed laterally movable balls captively held in a drilled hole formed radially through a shaft 31 which has a smaller diameter than the diameter of the axial bore in the bushing and is adapted to extend through the fastener receiving hole 33 in the work side structural member 13. The holes or apertures 15 and 33 are misaligned generally as shown in FIGS. 1 and 3. The latch elements 29 are urged into engagement with the indentations 25 in a selected bushing by actuation of a projection 35 protruding from a handle 37 mounted on the shaft 31. Further details of the latch element, shaft, and handle may be seen with reference to the above mentioned copending application.

With the blind side bushing 17 inserted in the blind side structural member 11 as shown in FIG. 1, a work side bushing 39 (having a slightly tapered body portion 40 in this instance) is inserted on the shaft, with the planar surface 41 of its enlarged head portion facing rearwardly.

Also mounted on the shaft 31 is an alignment collar 43 having an aperture 45 that receives the shaft 31. The collar has a large diameter shoulder 47 having an exterior surface 49 perpendicularly oriented relative to the aperture 45. In this instance the planar surface 49 of the alignment collar 43 has an indentation 51 adapted to mate with the planar surface 41 and shoulder of the work side bushing 39. Connected with the large diameter shoulder 47 is a generally cylindrical body portion 53.

Figure 2:
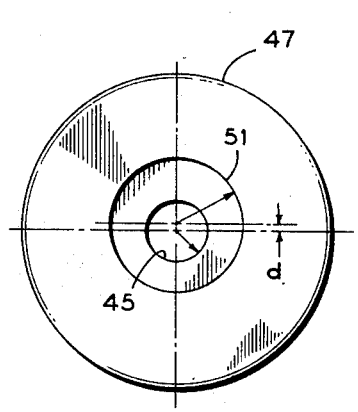
FIG. 2 is an end view of an alignment collar also shown in FIG. 1.

Referring to FIG. 2, it may be seen that the peripheral portion of the indentation 51 (which is circular in this instance) is eccentrically aligned relative to the axial bore 45 in the collar 43, with their radial axes being offset by a distance "d" corresponding with the amount of offset between the corresponding radial axes of the work side bushing 39.

In operation and as is shown in FIG. 3, the blind side and work side bushings 17 and 39 are shown inserted in their respective misaligned fastener receiving holes 15 and 33 in the blind side and work side structural members 11 and 13. This position is reached by threading the work side bushing onto the shaft 31. Next the indentations 25 in the blind side bushing are visually located and engaged with the latch elements 29 on the shaft 31 after passing the shaft through the aperture 33 in the work side structural member 13. The blind side bushing 17 is thereafter rotated until a clearance approximately equal to the minimum wall thickness of the work side bushing 39 is obtained between the shaft 31 and the aperture 33 in the work side structural member. Next the work side bushing 39 is introduced into aperture 33 in the work side structural member and the shaft 31 and work side bushing 39 rotated while "feeling" for the point of maximum alignment. The alignment collar 43 is engaged with the work side bushing 39 by pushing forward and rotating the collar until the cooperating indentation 51 mates with the enlarged head and the planar surface 41 of the work side bushing. Applying forward pressure to the collar and rearward pressure to the handle, each is now rotated until cocking (axial angularity) adjustment is indicated by parallel visual reference with the periphery of shoulder 47 and the exposed surface 48 of the work side structural member 13. Then, the shaft 31 may be retracted and the fastening device (shown in phantom in FIG. 1) tightened to pull the bushings into more complete seating. Then the nut of the fastener is loosened one turn and the bolt examined for axial looseness, indicating perfection of alignment. Finally, the bushings are forced into final seated position by fully tightening the nut.

It should be apparent from the foregoing that I have provided an invention having significant advantages. Utilization of the alignment collar enables cocking adjustment for press-fit eccentric bushings which have been partially introduced into their receiving, misaligned holes. The bushings are adjusted in this position of limited interference fit and then pulled down into final seating after adjustment to insure a perfect fit.

In addition, my invention enables rotational adjustment of the work side bushing after it is placed in the adjustment position of limited interference fit, thus improving the final accuracy of bore alignment.

While I have shown my invention in only one of its forms, it should be apparent to those skilled in the art that it is not so limited but is susceptible to various changes and modifications without departing from the spirit thereof. It is not essential, for example, that the member have the exact geometric structures shown in the drawing. The work side bushing may not have a completely planar surface which engages the alignment collar, but rather, may have only a peripheral edge which engages a mating portion of the alignment collar. The essential feature is that the alignment collar and the bushing mate in a manner such that vertical alignment of the bushing on the shaft is transmitted to the alignment collar for enabling accurate visual inspection of bushing alignment or misalignment.

I claim:

1. In a fastener and assembly means including a work side bushing, a blind side bushing, each having eccentric, axially extending bores to receive a shaft and a latch element that extends into an indentation in one of said bushings, all of which cooperate to connect structural members having misaligned fastener receiving holes, the improvement comprising:
    an alignment collar having an aperture that receives aid shaft, said collar having a large diameter shoulder that faces and engages the work side bushing;
    said work side bushing having a planar, exposed surface perpendicular with its axially extending bore;
    said alignment collar having a planar surface perpendicular with the axis of its aperture and larger than said planar surface of the work side bushing;
    both said planar surfaces selectively engaging for application of axial force and torque from the collar to the work side bushing whereby the work side bushing may be adjusted with limited interference fit and the collar visually inspected for space between the periphery of the collar and the associated structural member.

2. In a fastener and assembly means including a work side bushing, a blind side bushing, each having eccentric, axially extending bores to receive a shaft and a latch element that extends into an indentation in one of said bushings, all of which cooperate to connect structural members having misaligned fastener receiving holes, the improvement comprising:
    an alignment collar having an aperture that receives said shaft, said collar having a large diameter shoulder that faces and engages the work side bushing;
    said work side bushing having a peripheral edge perpendicular with its axially extending bore
    said alignment collar having a planar surface perpendicular with the axis of its aperture and larger than the peripheral edge of the work side bushing;
    both the peripheral edge of the work side bushing and the shoulder of the alignment collar selectively engaging for application of axial force and torque from the collar to the work side bushing, whereby the work side bushing may be adjusted with limited interference fit and the collar visually inspected for space between the periphery of the collar and the associated structural member.

3. The fastener and assembly means of claim 1 in which the work side and blind side bushings have tapered body portions.

4. The fastener and assembly means of claim 2 in which the work side and blind side bushings have tapered body portions.